W. S. HADLEY.
GUIDE ATTACHMENT FOR TAPS, REAMERS, &c.
No. 36,903. Patented Nov. 11, 1862.
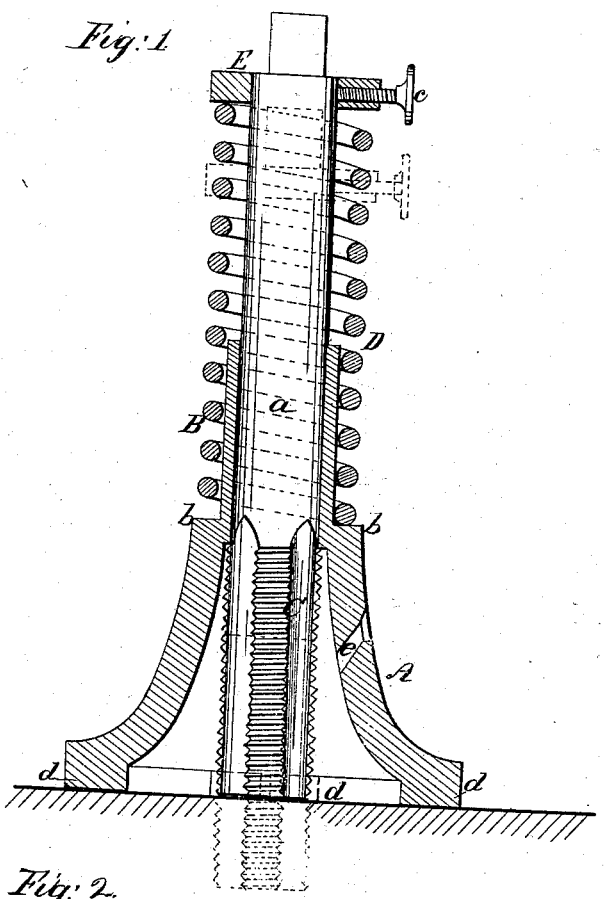
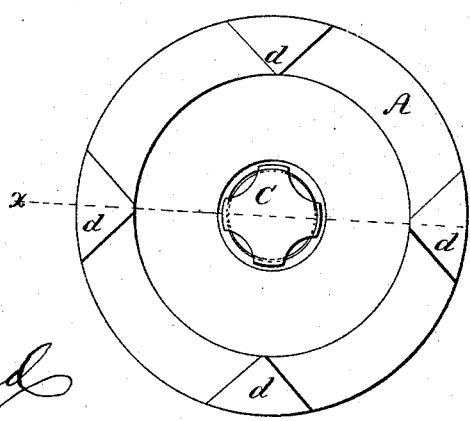
Witnesses:
J W Coomly
G W Reed
Inventor:
W S Hadley
per Munn & Co
Attorneys

UNITED STATES PATENT OFFICE.

WM. SWAIN HADLEY, OF NORWALK, OHIO.

IMPROVED GUIDE ATTACHMENT FOR TAPS, REAMERS, &c.

Specification forming part of Letters Patent No. 36,903, dated November 11, 1862.

*To all whom it may concern:*

Be it known that I, W. S. HADLEY, of Norwalk, in the county of Huron and State of Ohio, have invented a new and useful Guide-Attachment for Taps, Reamers, &c.; and I do hereby declare that the following is a full, clear, and exact description of the same, reference being had to the accompanying drawings, making a part of this specification, in which—

Figure 1 is a longitudinal section of my invention, taken in the line $a\ a$, Fig. 2; Fig. 2, an end view of the same.

Similar letters of reference indicate corresponding parts in the two figures.

This invention consists in the employment of a bell-shaped case provided with a tubular socket at its smaller end, through which and the case the tap or other tool passes, and using, in connection with the case aforesaid, a spring placed on or so arranged in relation with the tool and case that the latter will, as the tool is turned and commences its work, firmly adhere to the surface of the article being tapped, reamed, or bored, and serve as a guide for the tool, so that the latter will work perfectly true and without any special care on the part of the operator.

To enable those skilled in the art to fully understand and construct my invention, I will proceed to describe it.

A represents a bell-shaped case the smaller end of which has a tube, B, connected with it, the internal diameter of which is equal to the diameter of the shank $a$ of a tap, C, the shank $a$ being allowed to turn freely within the tube B. The smaller end of the case A is rather larger in diameter than the tube B, and a shoulder, $b$, is thereby allowed or formed on or against which one end of a spiral spring, D, bears, said spring being placed on the shank $a$ of the tap and having its opposite end bearing against a collar, E, which is fitted on the shank $a$ and secured thereto by a set-screw, $c$, as shown in Fig. 1.

On the larger end of the case A there are feet or projections $d$. Four of these may be used at equal distances apart, as shown in Fig. 2.

The tap C is constructed in the usual way, and therefore does not require a minute description.

The operation is as follows: In preparing the implement for use, the tap E is passed through the tube B into the case A, the spring D placed on the shank $a$ of the tap, and the collar E secured to the shank $a$, so that one end of the spring will bear against it while the opposite end will bear against shoulder $b$ at the small end of the case A. The tap C is then inserted in the hole in which it is to perform its work and turned in the proper direction so as to cut the screw-thread in the hole. As the tap feeds inward in the hole, the spring D is of course compressed, and, pressing against the shoulder $b$ on the case, keeps the large end of the latter, or, rather, the feet or projections $d$, closely in contact with the surface of the article in which the hole in process of tapping is made. The tube B serves as a guide for the tap, keeping it in line with the hole being tapped, while the bell-shaped case A serves as an efficient bearing or support for the tube, keeping it in proper position. By this simple device the holes will be tapped in a perfect manner and without any special care or attention on the part of the operator. The operator heretofore has had nothing to guide the tap, depending upon the eye alone or a simple square, the use of which is attended with considerable trouble and answers but very imperfectly the purpose designed. The tap is frequently entered in the hole angularly, the work commenced and some progress made before the operator is aware of the fact, and in endeavoring to straighten the tap or adjust it in line with the hole the former is frequently broken. This difficulty is fully obviated by my invention.

A hole, $e$, may be made in the case A for the purpose of lubricating the tap while at work.

I do not confine myself to a spiral spring, D, for other forms may be used; but the spiral spring would probably be preferable. Neither do I confine myself to a collar, E, for the outer or back end of the spring D to bear against, for a simple screw or other kind of stop might be used.

The tube B and case A may be cast in one piece.

Having thus described my invention, what I claim as new, and desire to secure by Letters Patent, is—

The case A, provided with the tube B, in combination with a spring, D, and collar or stop E, applied to a tap or analogous tool, substantially as and for the purpose herein set forth.

WM. SWAIN HADLEY.

Witnesses:
O. E. KELLOGG,
E. A. PRAY.